No. 662,261. Patented Nov. 20, 1900.
R. FORREST.
INSECT GUARD.
(Application filed Sept. 28, 1900.)
(No Model.)
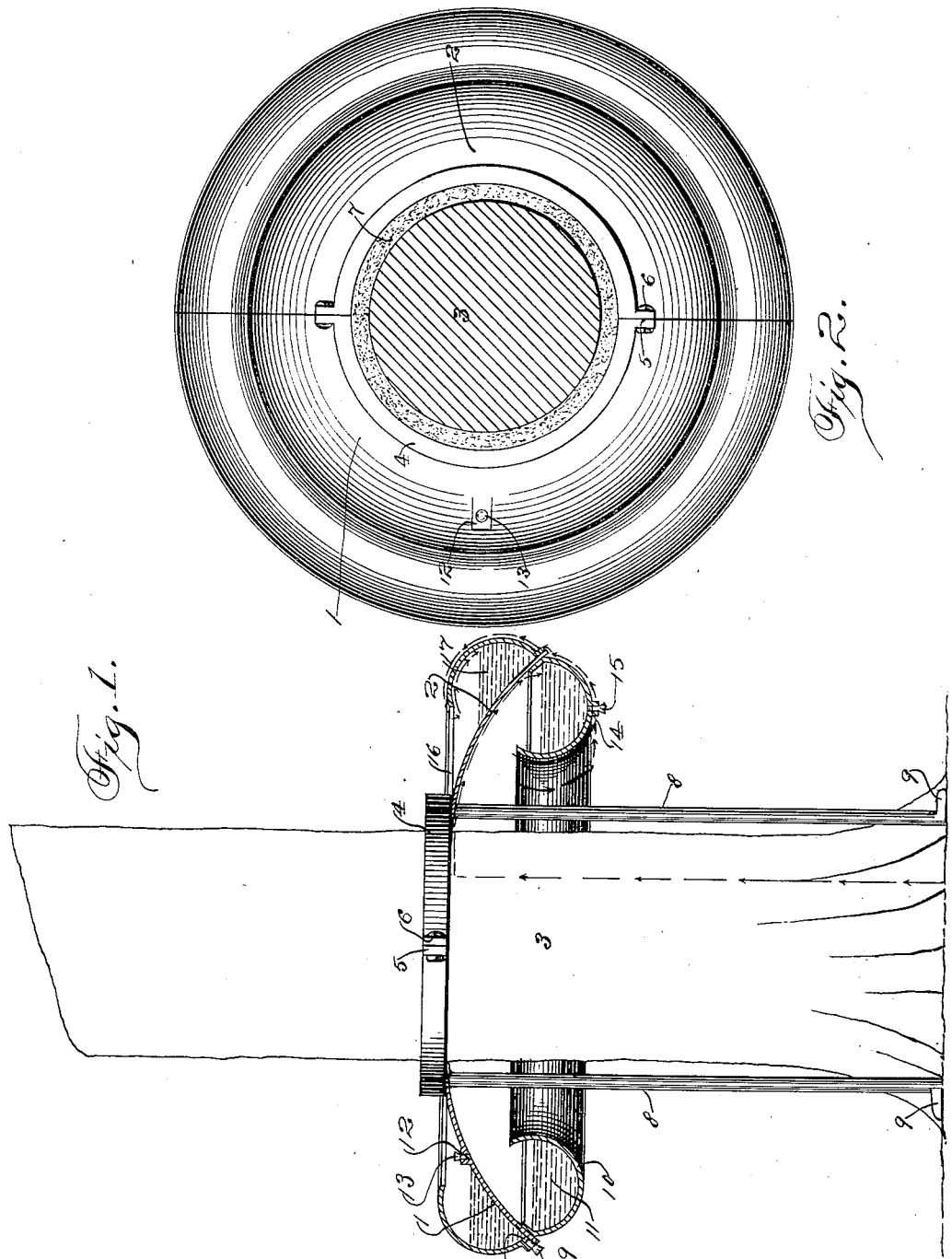
Witnesses
Fred E. Maynard
H. J. Shepard
R. Forrest, Inventor.
By C. A. Snow & Co.
Attorneys

UNITED STATES PATENT OFFICE.

ROLLAND FORREST, OF PHILADELPHIA, PENNSYLVANIA.

INSECT-GUARD.

SPECIFICATION forming part of Letters Patent No. 662,261, dated November 20, 1900.

Application filed September 28, 1900. Serial No. 31,418. (No model.)

*To all whom it may concern:*

Be it known that I, ROLLAND FORREST, a citizen of the United States, residing at Philadelphia, in the county of Philadelphia and State of Pennsylvania, have invented a new and useful Insect-Guard, of which the following is a specification.

This invention relates to insect-guards, and has for its object to provide an improved device of this character which is especially designed for application to trees, so as to protect the same from insects of various characters. It is furthermore designed to provide improved means for supporting the device upon a tree and also to provide an improved arrangement of traps or receptacles for entrapping and containing the insects.

With these and other objects in view the present invention consists in the combination and arrangement of parts, as will be hereinafter more fully described, shown in the accompanying drawings, and particularly pointed out in the appended claims, it being understood that changes in the form, proportion, size, and minor details may be made within the scope of the claims without departing from the spirit or sacrificing any of the advantages of the invention.

In the drawings, Figure 1 is a vertical central sectional view of an insect-guard constructed in accordance with the present invention and applied to a tree. Fig. 2 is a top plan view thereof, the tree being in section.

Corresponding parts are designated by like characters of reference in both figures of the drawings.

Referring to the drawings, it will be seen that the improved guard consists of the opposite duplicate semicircular disk-sections 1 and 2, which are concave upon the lower sides and convex upon their upper sides. The inner edges of the disk-sections have semicircular recesses formed in their inner edges, so as to embrace a tree 3, as best indicated in Fig. 2, and from each of these edges rises a clamping-band 4, having the outwardly-directed terminal perforate ears 5, which are designed to lie flat against the corresponding ears of the other band, so as to receive the fastening devices 6, whereby the guard is clamped to the tree. Prior to tightening the fastening devices a filling of clay or other suitable material 7 is placed between the clamping-band and the tree, so as to accommodate the device to the growth of the tree. Pendent from each clamping-band is one or more leg-standards 8, having feet 9 at their lower ends to rest upon the ground and aid in the support of the guard. It is not designed to have the entire weight of the device supported by the band clamping the tree, as the latter would be injured thereby; but it is designed to have the leg-standards support the entire weight of the device.

As best indicated in Fig. 1 of the drawings, it will be seen that each disk-section is provided with an outer marginal gutter 10, which is located upon the under side of the disk, the closed side of the gutter being at the outer marginal edge of the disk and the open side lying between the opposite edges thereof. This gutter, trap, or receptacle is designed to contain a suitable poisonous liquid 11, which is poured into the gutter through an inlet-opening 12, formed through the disk and directly over the open upper side of the gutter, this opening being normally closed by means of a suitable closure—as, for instance, a plug 13. The bottom of the gutter is also provided with a drain-opening 14, whereby the liquid may be drawn off for cleansing the gutter, and a suitable closure-plug 15 is employed to normally close said opening.

Rising from the outer marginal edge of the disk is a flange 16, which bows inwardly for a suitable distance, so as to form an upper and outer gutter that is open at its inner side and closed at its upper side by the overhanging flange. This gutter is also designed to contain a liquid 17, which may be introduced therein through the inner open side thereof, as the inner edge of the overhanging flange terminates short of the inner edge of the disk and above the intermediate portion thereof. To draw off the contents of this latter gutter, a suitable drain-opening 18 is formed in the lower portion of the gutter and normally closed by a plug 19.

From the foregoing description it will be apparent that the present device is formed in opposite sections, so as to be conveniently applied to a tree and is also provided with means for supporting the device independently of the tree, so as to prevent injury to the bark thereof; also, any insects attempting to crawl up the tree must pass through one or both of the gutters; but as the latter contain a liquid the insects will be prevented from passing the guard. The purpose of the upper gutter or trap is to catch such insects, worms, or the like as may pass around the outer side of the lower gutter, the upper edge of the upper gutter being at such a distance from the top of the disk as to prevent the insects from passing directly to the disk without first passing through the liquid within the gutter.

What is claimed is—

1. An insect-guard, having a central opening, an outer and under marginal gutter, and an upper and outer marginal gutter.

2. An insect-guard, having a pendent outer marginal flange, which is rebent inwardly beneath the guard and forms a gutter, which is open at its upper side, and an upstanding outer marginal flange, which is extended inwardly and terminates above and intermediate of the opposite edges of the guard, thereby forming an upper gutter.

3. An insect-guard, comprising opposite duplicate semicircular disk-sections, having inner semicircular clamping-bands, fastenings for the corresponding ends thereof, leg-standards pendent from the bands, an outer marginal and under gutter, and an outer marginal and upper gutter.

In testimony that I claim the foregoing as my own I have hereto affixed my signature in the presence of two witnesses.

ROLLAND FORREST.

Witnesses:
EDWARD JONES,
EDWARD ROWSON.